Jan. 3, 1956
G. A. FRANK ET AL
2,729,034
WORK TABLE FEEDING MECHANISM
Filed Jan. 29, 1954
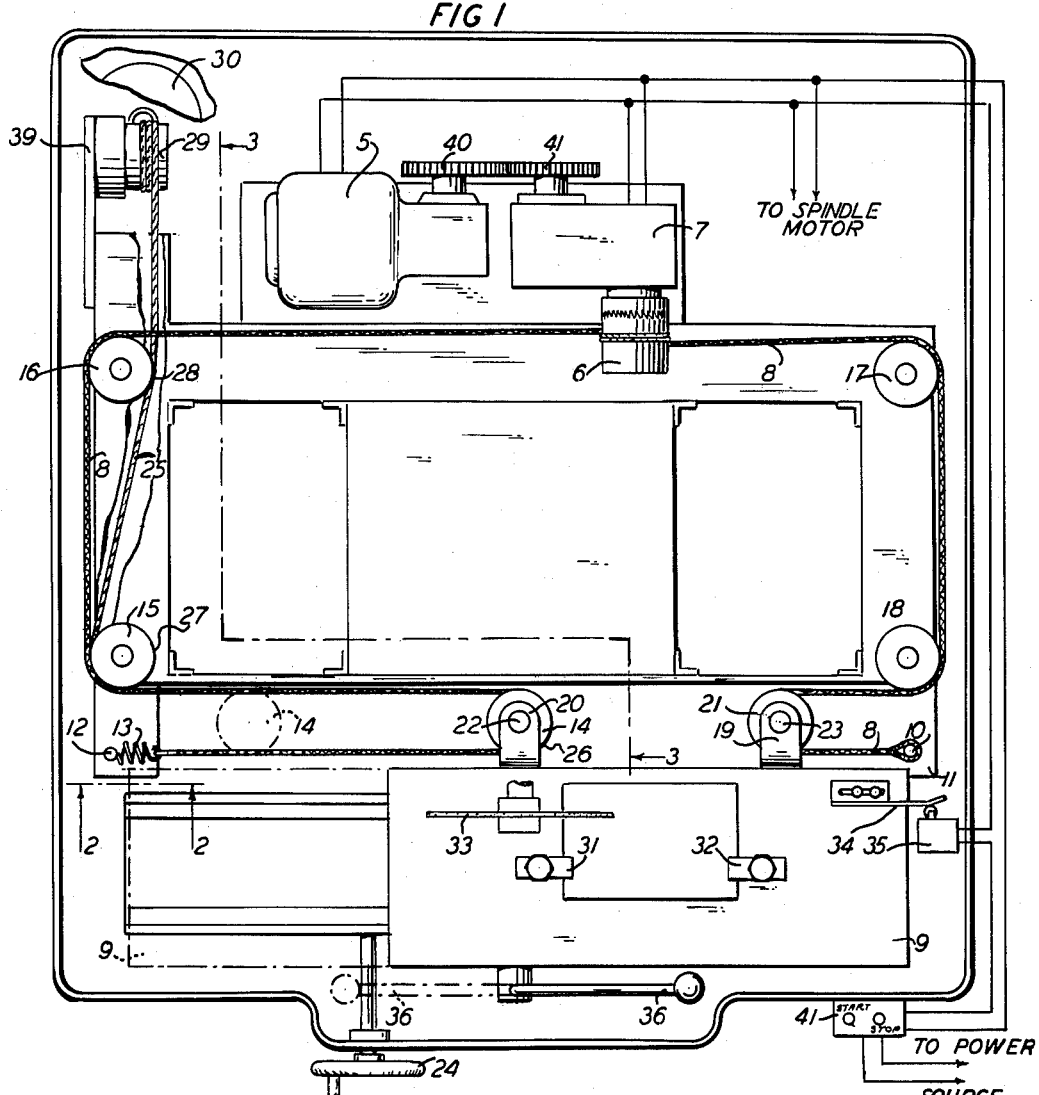
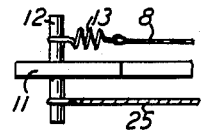
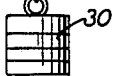
INVENTORS
G. A. FRANK
J. J. MONAHAN
BY *W. C. Parnell*
ATTORNEY

United States Patent Office 2,729,034
Patented Jan. 3, 1956

2,729,034

WORK TABLE FEEDING MECHANISM

Gerard A. Frank and Jack J. Monahan, Allentown, Pa., assignors to Western Electric Company, Incorporated, New York, N. Y., a corporation of New York Application January 29, 1954, Serial No. 406,943

3 Claims. (Cl. 51—92)

This invention relates to a work table feeding mechanism and particularly to apparatus for feeding a work table past a driven tool at a slow uniform rate with substantially all of the backlash eliminated therefrom.

In making plunge cuts on hard, brittle materials such as germanium, that is, where the saw takes a full cut through the material initially, very slow feeding rates, ranging for example, from ½ to ¾ of an inch per minute, must be used. If any backlash is present in the table feed mechanism, this type of cut has a tendency to cause chatter and thereby chip the brittle material. For precision cutting, as required in transistor manufacture, chipping of the germanium renders the material unusable and consequently cannot be tolerated. Anti-backlash systems, currently used for performing such cutting operations, utilize expensive hydraulic feed systems or precision lead screws for controlling the feed of the table.

It is, therefore, the principal object of this invention to provide inexpensive apparatus for producing slow feeding motions in which backlash is substantially eliminated.

One embodiment of the invention for feeding a work table past a driven tool comprises a winch and a cable extending around the winch for moving the table, a second cable for the table extending around a capstan which is free to rotate only in one direction and means for maintaining tension in the second cable opposing motion of the table in the direction corresponding to the free rotation of the capstan for eliminating backlash from the table moving apparatus.

By using an overrunning clutch in conjunction with the capstan, the capstan will rotate freely only when the table is moved in the feeding direction. When the table reaches the end of its feeding travel, the winch is disconnected from the driving means therefor and, if it were not for the overrunning clutch, the counterweight would return the table to the starting position. Since the overrunning clutch is not free to rotate in this return direction, however, the aforementioned second cable will bind on the capstan to prevent the return of the table until the driven tool can be removed from the return path to prevent injury to the processed brittle material mounted on the table. When this has been done, the table is moved to the starting position manually. This manual movement of the table to its starting position relieves the tension on the counterweight cable permitting it to pay off on the capstan to lower the counterweight, preparing it for the next feeding operation.

These and other features of the invention will be more fully understood from the following detailed description taken in conjunction with the accompanying drawing in which:

Fig. 1 is a plan view of a portion of a germanium cutting machine embodying the features of the present invention;

Fig. 2 is a sectional view on the line 2—2 of Fig. 1 showing how the feed table cables are attached to the frame; and Fig. 3 is a sectional view on the line 3—3 of Fig. 1 (not to the scale of Fig. 1).

Referring now to the drawing, motor 5 drives winch 6 through a solenoid actuated clutch assembly 7. A cable 8, for moving the work table 9, extends around and is driven by the winch 6. One end of cable 8 is attached to the fixed pin 10 at the right side of the stationary machine frame 11, the other end of the cable being connected to a spring 13 which is attached to a second pin 12 on the left side of the frame. The spring 13 takes up the slack and maintains tension in this table drive cable. The cable 8 passes successively over sheaves 14, 15 and 16, around the winch 6 and over sheaves 17, 18 and 19. Sheaves 14 and 19 are slidably mounted on shafts 22 and 23 which are mounted by brackets 20 and 21 respectively to the movable work table 9. These sheaves, 14 and 19, which are slip fitted on their shafts are moved vertically on their respective shafts by the tension exerted thereon by the cable 8 when the table 9 is raised or lowered by rotation of handwheel 24 which raises or lowers the ways for the table. The details of this vertical adjusting means are not shown as they are well known in the art and as such need not be described herein.

As seen in Fig. 2, a second cable 25 is attached to the lower portion of pin 12. The cable 25 threads around sheave 26 which is slidably mounted on shaft 22 on the movable work table, the sheaves 27 and 28 mounted on the machine frame, wraps around a capstan 29 and is attached to a counterweight 30. Capstan 29 is controlled by an overriding clutch 39 to which it is mounted and which enables the capstan 29 to rotate freely in a counterclockwise direction as shown in Fig. 3, and prevents clockwise rotation thereof.

In the starting or loading position, the table 9 is positioned at the left side of the machine as shown by the dashed lines in the drawing. The germanium to be cut is securely mounted on the table by means of clamps 31 and 32 provided therefor. The spindle motor (not shown) and the feed motor 5 are started and the winch 6 is engaged by the operation of the solenoid actuated clutch 7 when a switch 41 is thrown to energize the motors and solenoid. The speed of the feed is determined by the ratio of the gears 40 and 41 driven by motor 5. Any desired speed can be obtained by changing these gears in accordance with established practice. The table is fed under a diamond blade 33, shown in phantom in the drawing, (the driver for the blade is not shown since it is of conventional design) until, at the completion of the cutting operation, the table has advanced to the extreme right of the machine when the member 34 on the table engages and actuates a microswitch 35 which opens the power supply circuit. The spindle and feed motors as well as the solenoid operated clutch 7 are thereby de-energized, disengaging the winch 6 and stopping the table motion.

The binding of the cable 25 on the uni-directional capstan 29 prevents the counterweight from returning the table to its starting position to the left of the machine. After the table 9 has been lowered by operation of handwheel 24 to remove the blade from the return path of the table, since the clutch assembly 7 had disengaged the winch 6, the winch is free to rotate freely and the table may be moved to the starting position by means of the hand lever 36. In moving the table in this direction, the tension in cable 25, between pin 12 and the capstan 29, is relieved permitting it to pay off on the capstan 29 and return the counterweight to its lowered or starting position.

It is to be understood that the above described arrangements are simply illustrative of the application of the principles of the invention. Numerous other arrange-

What is claimed is:

1. In a machine having a driven tool and a table for supporting work to be moved with respect to the tool, a winch and a cable extending around the winch for moving the table, a capstan free to rotate only in one direction, a second cable for the table extending around the capstan and means for maintaining tension in the second cable opposing motion of the table in the direction corresponding to the free rotation of the capstan.

2. In a machine having a driven tool and a table for supporting work to be moved with respect to the tool, a winch, a driver for the winch, and a cable extending around the winch for moving the table, a capstan free to rotate only in one direction, a second cable for the table extending around the capstan, means for maintaining tension in the second cable opposing motion of the table in the direction corresponding to the free rotation of the capstan and means for disengaging the winch from the driver.

3. In a machine having a driven tool and a table for supporting work to be moved with respect to the tool from a starting position to a final position, a winch, a driver for the winch, a clutch connected between the driver and the winch, a solenoid actuator for the clutch, a source of power for the driver and the solenoid actuator, a circuit including a switch for connecting the source to the driver and the solenoid actuator, a cable extending around the winch for moving the table, a capstan free to rotate only in one direction, a second cable for the table extending around the capstan, means for maintaining tension in the second cable opposing motion of the table in the direction corresponding to the free rotation of the capstan and means mounted on the table for actuating the switch when the table reaches the final position for opening the circuit.

References Cited in the file of this patent

UNITED STATES PATENTS

| 160,513 | Dorman | Mar. 9, 1875 |
| 927,695 | Stake | July 13, 1909 |
| 1,922,176 | Ruhland | Aug. 15, 1933 |
| 2,370,701 | Woodbury | Mar. 6, 1945 |
| 2,373,336 | Perkins et al. | Apr. 10, 1945 |
| 2,395,485 | Jones | Feb. 26, 1946 |
| 2,677,923 | Parker | May 11, 1954 |

FOREIGN PATENTS

| 77,100 | Germany | Dec. 14, 1893 |
| 166,615 | Austria | Jan. 15, 1950 |